United States Patent [19]

Caisley

[11] Patent Number: 6,021,592
[45] Date of Patent: Feb. 8, 2000

[54] EAR TAG FOR MAKING AN ANIMAL

[75] Inventor: Roy Caisley, Isselburg-Vehlingen, Germany

[73] Assignee: Reinhard Nehls, Bocholt, Germany

[21] Appl. No.: 08/714,150

[22] PCT Filed: Mar. 10, 1995

[86] PCT No.: PCT/EP95/00937

§ 371 Date: Nov. 13, 1996

§ 102(e) Date: Nov. 13, 1996

[87] PCT Pub. No.: WO95/25426

PCT Pub. Date: Sep. 28, 1995

[30] Foreign Application Priority Data

Mar. 18, 1994 [NL] Netherlands .......................... 9400434

[51] Int. Cl.[7] ................................. G09F 3/00; G09F 3/12
[52] U.S. Cl. ............................................. 40/301; 40/668
[58] Field of Search .......................... 40/300, 301, 668; 606/116, 117; 411/498, 903

[56] References Cited

U.S. PATENT DOCUMENTS

| | | | |
|---|---|---|---|
| 3,184,874 | 5/1965 | Schofield | 40/301 |
| 3,731,414 | 5/1973 | Murphy et al. | 40/301 |
| 4,209,924 | 7/1980 | Fearing | 40/301 |
| 4,597,208 | 7/1986 | Chevillot | 40/301 |
| 4,653,208 | 3/1987 | Wassilieff | 40/301 |
| 4,694,781 | 9/1987 | Howe et al. | 40/301 X |
| 4,958,452 | 9/1990 | Tate | 40/301 |
| 5,308,351 | 5/1994 | Nehls | 40/300 X |

FOREIGN PATENT DOCUMENTS

| | | | |
|---|---|---|---|
| 3116972 | 12/1982 | Germany | 40/301 |
| 9006050 | 6/1990 | WIPO | 606/116 |

*Primary Examiner*—Brian K. Green
*Attorney, Agent, or Firm*—Helfgott & Karas, PC.

[57] ABSTRACT

An ear tag for marking an animal includes a first tag part and a second tag part having an accommodation opening. A pin has a conically pointed head at one end for passing through the accommodation opening, and the pin connects to the first tag part at its other end. A shank extends between the head and the first tag part. The head includes a cutting body having cutting edges extending generally away from the conical point toward the shank. The cutting body is embedded in the head with the cutting edges defining an outer surface of the head. The cutting body is harder than an embedding material of the head. Forces required to attach the ear tag are reduced by cutting action of the cutting edges.

14 Claims, 3 Drawing Sheets

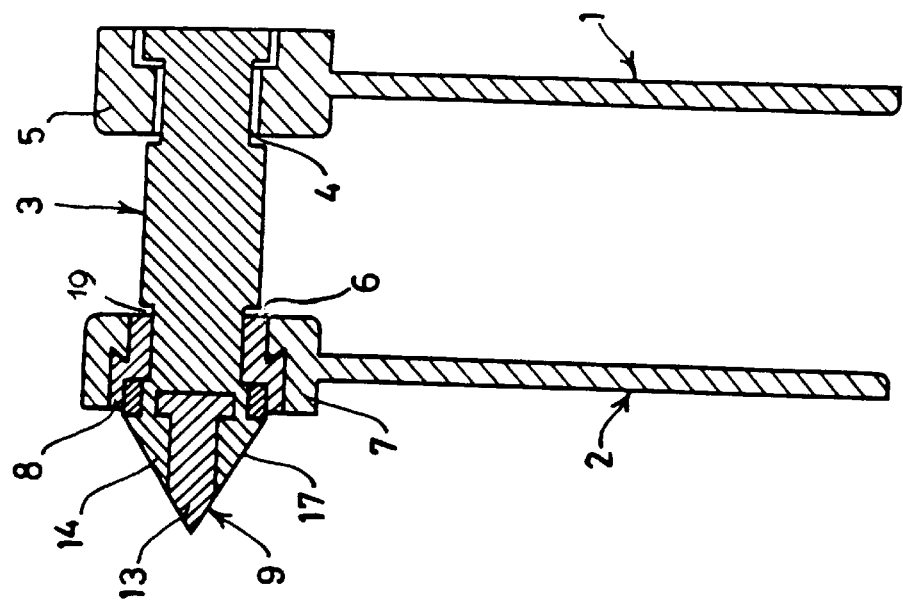
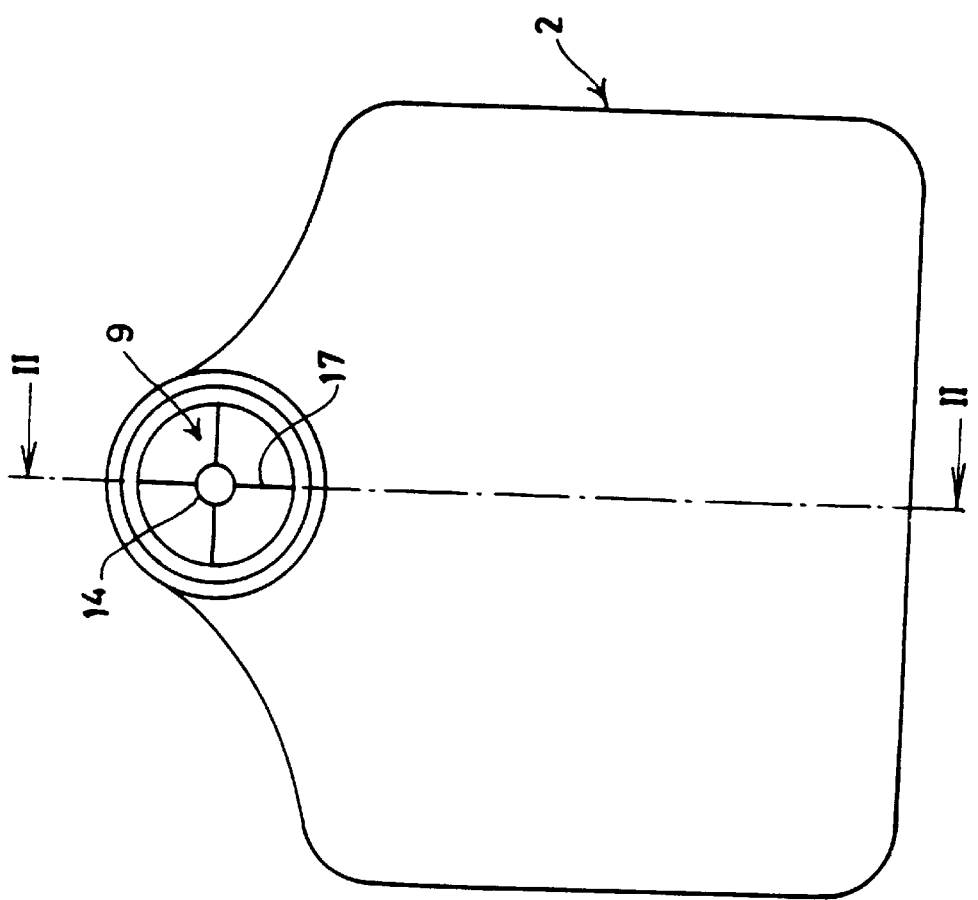

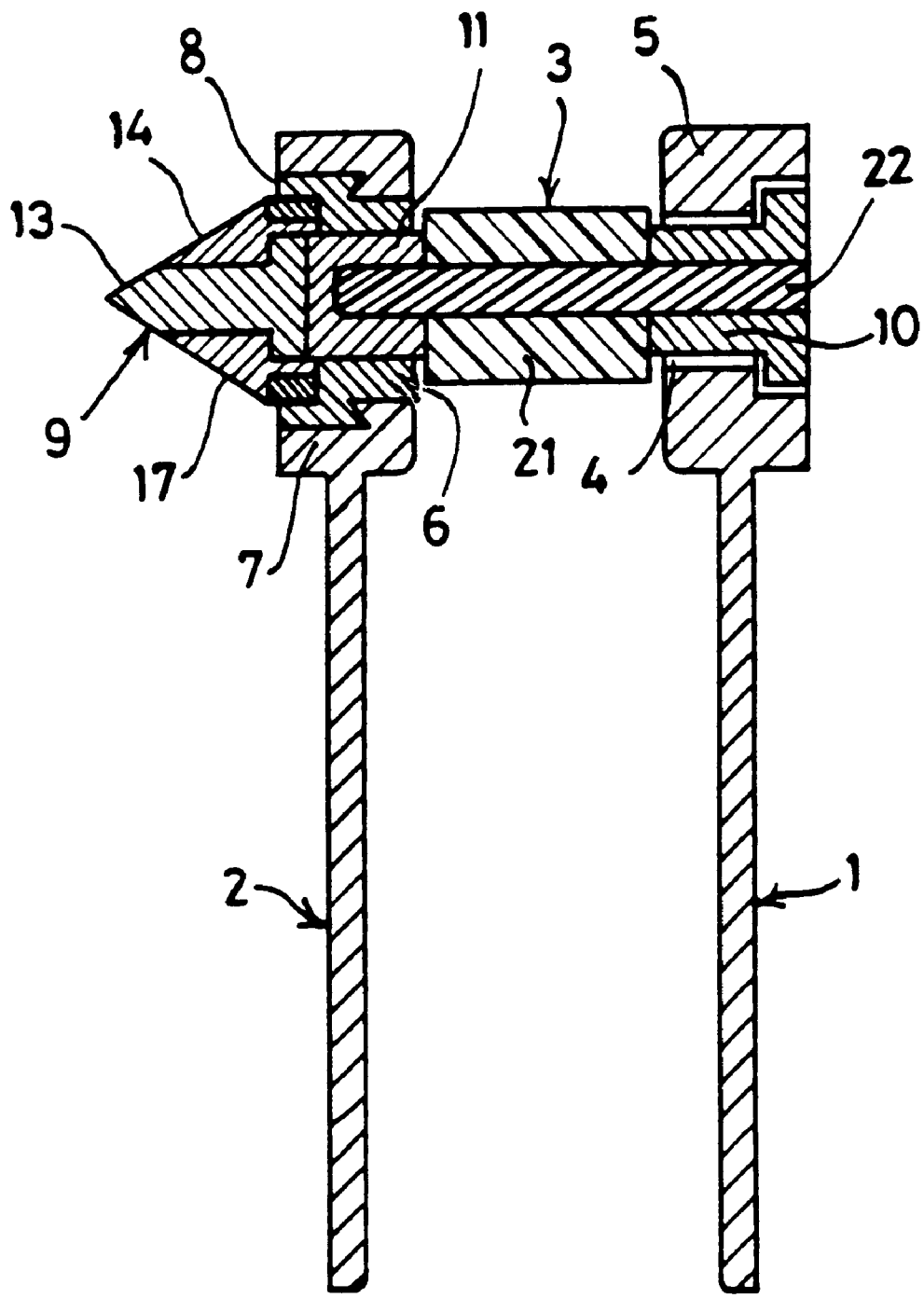

ated animal one part or both parts can be provided with identification marks. The parts of the ear tags are manufactured as far as possible from plastic material, in order to permit mass production at low cost. It is pointed out that the invention also relates to ear tags in which the pin and the first part are manufactured integrally.

EAR TAG FOR MAKING AN ANIMAL

BACKGROUND OF THE INVENTION

The present invention relates to an ear tag for marking an animal, according to the preamble of claim 1.

Such an ear tag is known, for example from GB-A-1 293 157. These and other ear tags fitted in the same way are put on the market in large numbers for quick and simple marking of, for example, pigs and cows. When the tag is fitted, the pin projects through the ear of the animal, and a part of the ear tag which is generally plate-shaped is situated on both sides of the ear. For the visual identification of the animal one part or both parts can be provided with identification marks. The parts of the ear tags are manufactured as far as possible from plastic material, in order to permit mass production at low cost. It is pointed out that the invention also relates to ear tags in which the pin and the first part are manufactured integrally.

The ear tag disclosed in GB-1 293 157 has a plastic pin comprising a shank with a pointed head, in which the pointed head is pyramid shaped. The sharp edges of the pyramid provide for a concentration of the pressing-in force, thereby facilitating the penetration through the ear of the animal. This concentration of the pressing-in force is however insufficient to obtain a noticeable improvement when the pin penetrates through the ear of the animal.

Another ear tag is described in EP 0,105,796 and has a hollow pin made of flexible plastic. The conical head of the pin is provided with a very hard element, particularly of metal, which forms the pointed part of the head. The object of providing this very hard point is to achieve improved penetration of the pin into the ear of the animal. This is advantageous both for the animal and in terms of the force required for fitting the tag. The fact that the shank of the pin is made of a flexible material, in such a way that the shank can withstand the pressure load occurring during the insertion, has the generally accepted advantage that it gives the first and the second part of the ear tag a certain mobility. This is important, for example, if the animal becomes caught up somewhere by ear tag. Moreover, in a design of the ear tag in which the pin is integral with the first part, on account of the desired flexible material of the first part, making the pin of the same flexible material is a great advantage as far as production is concerned.

SUMMARY OF THE INVENTION

When the pin of EP 0 105 796 is being pressed into the ear, the pressing-in force prevailing between the conical surface of the head and the ear is virtually uniform in the peripheral direction of the conical surface. In fact, this means that the pressing-in force exerted on the pin is uniformly distributed over the entire conical surface. Since the ear material of the animal will give way only when the tension created at a particular point exceeds the tear limit of said ear material, a very great force therefore has to be exerted when the is being pressed into the ear.

The object of the present invention is to eliminate the abovementioned disadvantages and to provide an ear tag which can be fitted quickly with little effort, and in the kindest possible way to the animal, and which is also comfortable for the animal during wear.

This object is achieved by an ear tag of the type mentioned in the preamble, which is characterized in that a cutting body is embedded in the head of the pin, the cutting body being of harder material than the head of the pin and defining the at least one cutting line (cutting edge) in the outer surface of the head, which outer surface is essentially bounded by the softer material of the head.

The present invention is based on the insight that the head in fact produces an opening in the ear for the passage of the shank of the pin. If this is carried out in the same way as that of the known ear tags, by pressing the ear material away laterally and partially tearing it, great force is required for the insertion, on the one hand, and an ugly wound is produced in the ear, on the other. By producing a concentration of the pressing-in force along one or more cutting lines, provided by a cutting body which is embedded in the softer material of the pin, according to the present invention, it is ensured that at those counts the tear limit of the ear material is quickly exceeded, so that the ear is cut into there during the penetration of the pin into the ear.

Preferably the cutting body is embedded in the material of the shank of the pin. This makes it possible to combine the advantages of a flexible shank with a cutting action of the head of the pin. The reduction in the pressing-in force achieved by the cutting action of the cutting body also makes an even more flexible design of the shank possible. The embedding of the cutting body in the material of the shank makes a simple attachment possible and also provides support for the parts of the cutting body which are under load during the pressing-in operation. The cutting body can be fully embedded in the material of the shank, so that the spaces between the parts of the cutting body forming the cutting lines can be filled up to a conical shape. The presence of softer material between the harder parts of the cutting body forming the cutting lines ensures that the parts of the ear material lying against this softer material are stretched. As is generally known, stretching a yielding material facilitates the cutting of said material.

In a particularly advantageous embodiment the pointed head forms an annular shoulder projecting outwards from the shank of the pin, and the cutting body comprises an annular element forming part of said shoulder. A shoulder at the position of the transition from head to shank is known in the case of many ear tags of the type mentioned in the preamble, since the connection of the pin to the second part is then achieved through the head being forced through the accommodation opening in the second part. The presence of an annular element proposed according to the present invention in the cutting body in the region of the shoulder effects a "punching action". This means that the ear material stretched and cut into by the head of the pin is punched and thus detached from the ear through the interaction of the second part and the annular element of the cutting body. This removal by the punching action is made easier if the area of the second part lying around the accommodation opening, as in the case of the annular element, is made of a relatively hard material. The removal of ear material is advantageous as regards prevention of infections of the wound.

In an embodiment suitable for an essentially conical head of the pin, the cutting body is also essentially conical and comprises a disc element which is provided with openings and forms the base of the cone shape, and which disc element is provided on the outer periphery with an annular wall standing up in the direction of the top of the cone, a central column extending from the disc element to the top of the cone, and several cutting elements extending from the top of the column to the annular wall. The cutting elements are preferably situated at regular angular distances in the cone surface. In a practical embodiment the cutting body comprises four cutting elements.

Preferably, the head of the pin is connected to the shank so that it is rigid in the direction of pressure, and is movable in a direction essentially perpendicular to the direction of pressure. This measure is based on the insight that such a connection is simple to carry out in practice and involves the advantage of the pin being highly flexible without detracting from the resistance to the pressure load occurring when the pin is being pressed into the ear.

In a preferred embodiment the head of the pin is a separate part which rests against the shank, while a flexible connecting element which connects the head and the shank of the pin to each other is provided. The fact that the head rests against the pin, in line therewith, makes it possible to transmit a pressure force directed towards the shank. Any load on the head in any other direction will, however, lead to the head moving relative to the shank, through the yielding of the flexible connecting element.

In an advantageous embodiment the flexible connecting element is an element of elastically stretchable material extending through the shank and connected to the head. This makes it possible to place a hollow shank and a loose head part provided with a cavity in a mould and to fill up the cavity extending through the two parts by injecting a flexible, for example foam-type, material.

The sole right applied for also relates to a pin for an ear tag according to the present invention. In many cases the pin is in fact a separately manufactured part of the ear tag, unlike that of EP 0,105,796.

BRIEF DESCRIPTION OF THE DRAWING

The invention will be explained in greater detail below with reference to the appended drawing, in which:

FIG. 1 shows a front view of a first embodiment of the ear tag according to the invention, FIG. 2 shows a side view, in section, of the ear tag in FIG. 1, FIG. 5 shows a view corresponding to FIG. 2 of a second exemplary embodiment of the ear tag according to the invention.

DETAILED DESCRIPTION OF PREFERRED EMBODIMENTS

Figure 4:
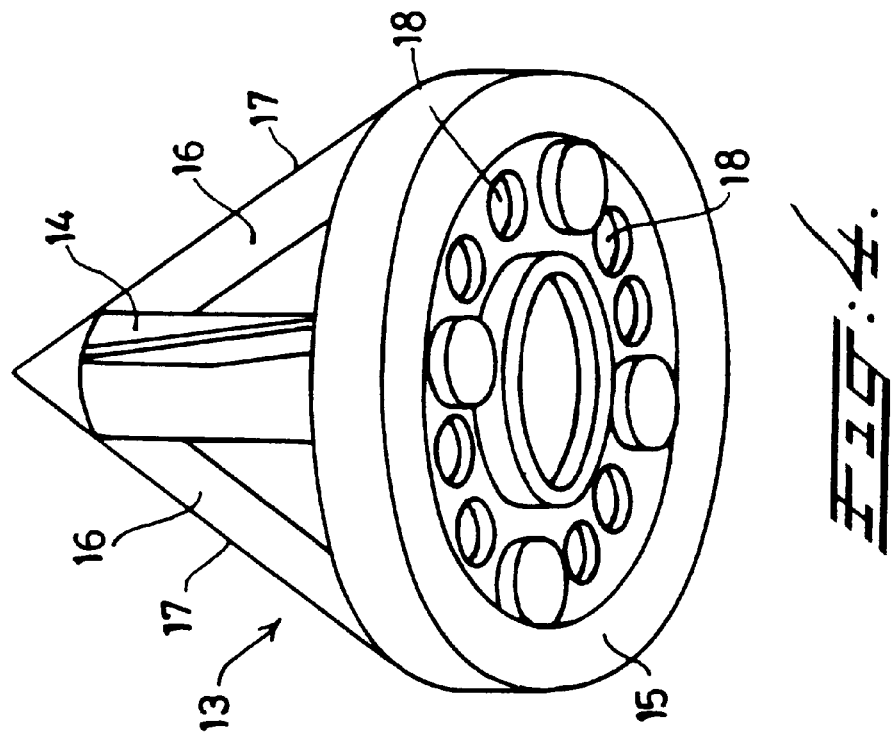
FIG. 4 shows the cutting unit of FIG. 3 from another direction.

The ear tag shown in FIGS. 1 and 2 consists of a first part 1, a second part 2, and a pin 3 which is connected in a freely rotatable manner to the first part 1 and is inserted through the second part 2 and held clamped therein.

The first part 1 is made of a flexible plastic and has an essentially rectangular, flat body. Visual identification marks can be placed on the body. The first part 1 is provided with an opening 4 surrounded by a collar 5. A first end of the shank of the pin 3 lies in the opening 4.

The second part 2, like the first part 1, is essentially made of a flexible plastic and has an essentially rectangular, flat body. The second part 2 is provided with an accommodation opening 6, which is bounded by a surrounding collar 7. The part of the collar 7 adjoining the accommodation opening 6 is formed by a ring 8 made of a harder plastic than the body of the second part 2.

When the ear tag illustrated is being fitted, using hand fitting pliers suitable for the purpose, the assembly of the first part 1 and the pin 3 is placed in one jaw of the fitting pliers, and the second part 2 of the ear tag is placed in the other jaw of the fitting pliers. The ear is then placed in the pliers and the jaws are pinched together. This will cause the pin 3 to penetrate with its head 9 into the ear until the head 9 is finally also forced through the accommodation opening 6 of the second part 2. It can be seen clearly that the outward projecting shoulder present between the head and the shank of the pin 3 has a greater diameter than the accommodation opening 6. In order to allow the head 9 through, the collar 7 surrounding the accommodation opening will have to deform. It is, however, desirable to make the ring 8 of relatively hard material, in order to obtain an anvil effect, since supporting the ear on a solid support makes it easier for the pin 3 to penetrate the ear.

The head 9 of the pin 3 is provided with a cutting body 13, which will be explained below. In the exemplary embodiment shown, the cutting body 13 is manufactured as a separate element and in an injection moulding process is then moulded as an insert onto the shank of the pin 3. The cutting body 13 is made of a harder plastic than the plastic material of the shank. The shank and head can also be of a plastic material of the same type and colour, the only difference being a difference in hardness. If the cutting body 13 is completely embedded in the material of the shank, this means that in practice the cutting body 13 in the head 9 will be barely visible, or not visible at all.

Figure 3:
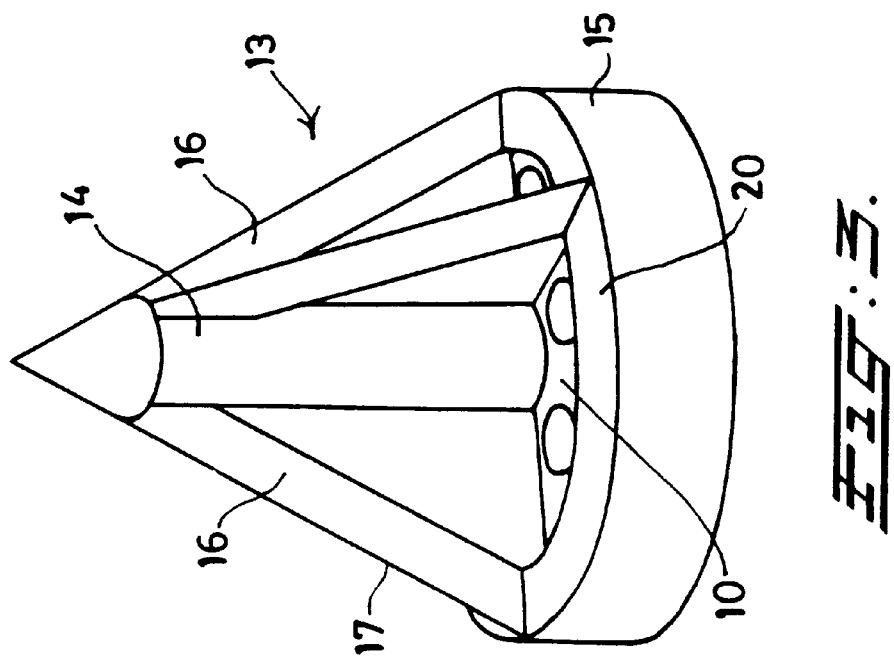
FIG. 3 shows in perspective a cutting unit present in the head of the pin of the ear tag of FIG. 1.

The cutting body 13 is shown in detail in FIGS. 3 and 4. The cutting body 13 has a conical shape, the external dimensions of the cone corresponding to the envisaged external dimensions of the conical head 9 of the pin 3. A hollow cylinder 14 extends between the top of the cone shape and the circular base of the cone shape. The base of the cone shape is formed by a disc element 15, which on its outer periphery has an annular wall 20 standing up in the direction of the top of the cone shape. The annular wall 20 forms the outer limit of the shoulder between the head and the shank of the pin. The cutting body 13 also has over the periphery of the cone shape uniformly distributed cutting elements 16 extending from the top to the annular wall. The cutting elements 16 have an essentially triangular cross-section, while a top of that triangle ultimately lies in the cone surface of the head 9. Due to the fact that the disc element 15 is provided with openings 18, plastic can pass through these holes into the spaces present in the cutting body 13 during the injection moulding process. Depending on the shape of the mould in which the cutting unit 13 has been placed, the cutting elements 16 then lie flush with, above or even slightly below the external surface of the head 9 bounded by the softer material of the shank. The embedding of the cutting body 13 in the material of the shank results in a very good connection between the cutting body 13 and the shank. The material of the shank also supports the cutting body 13 if the latter is subjected to a heavy load during the penetration into the ear. A very important effect of the embedding of the cutting body 13 in the softer material is that the ear material is stretched through the presence of this soft material. The stretching of the ear material produces a much more favorable situation for the cutting.

During the fitting of the ear tag according to the invention the following effects occur. When the pin 3 is being pressed into and through the ear material, a pressing-in force occurs between the head 9 of the pin 3, on the one hand, and the ear material, on the other. Contrasting with the known ear tags, in which said pressing-in force is distributed more or less uniformly around the periphery of the conical surface, the cutting body 13, which is hard compared with the embedding material, causes this pressing-in force to be concentrated at a number of points (cutting lines or edges 17) of the conical surface. These points coincide with the cutting elements 16 of the cutting body 13, because the softer embedding material is pressed backwards relative to the cutting body 13. The concentration of the pressure exerted on the ear along these cutting lines 17 leads to an actual incision of the ear at these points. When the jaws of the pliers are moved even closer together, the head 9 of the pin 3 is forced through the ring 8 of the second part 2 until the ring 8 falls into a groove 19 of the shank of the pin 3. During this part of the pressing-in operation of the pin 3 the annular wall 20, interacting with the collar 7, in particular the relatively hard ring 8, effects a punching action on the ear material. This means that the ear material, which has already been cut into in a star shape, is then cut off in a ring shape through the action of the hard annular wall 20. The loose parts of ear material obtained here are removed to the outside along with the head 9 of the pin. This reduces the infection problem. It is clear that the cutting and punching action obtained with the embodiment of the pin described leads to a considerably more acceptable wound in the ear of the animal than that in the case of the known ear tags. It is pointed out here that the invention allows the generally accepted and advantageous cone shape of the head to be retained.

The present invention is also suitable for designs of ear tags in which the first part 1 and at least the shank of the pin 3 are manufactured integrally by injection moulding.

FIG. 5 shows a variant of the ear tag described above with reference to FIGS. 1–4. Correspondingly designed parts are therefore indicated by the same reference numbers. What is different from the ear tag according to the invention already described is the structure of the pin 3. While the above-described pin 3 consisted of a single body with a cutting body 13 of harder material accommodated therein, in FIG. 5 the pin is composed of several bodies. First, it is the head 9 which is now integral with a part 11 of the shank of the pin clamped in the ring 8. This means that the conical head 9 containing the harder cutting body 13 (see FIGS. 3 and 4) is manufactured integrally with the hollow cylindrical part 11 in an injection moulding process. Secondly, the pin 3 comprises a plastic part 10 which is manufactured as a separate part and is designed to be accommodated in a freely rotatable manner in the first part 1. A third plastic part 21 of the pin 3 is situated between the part 10 and part 11 of the pin. The three parts 9, 11 and 21 and 10 are interconnected through the fact that the cavity extending through the three parts is injected full with an elastically stretchable plastic material 22.

The effect envisaged with the embodiment of the pin 3 described here is as follows. For the pin 3 to be pressed into the ear of an animal, the pin 3 must be able to withstand a great pressure load. On the other hand, it is desirable to give the ear tag great flexibility, in particular on account of the risk of the animal becoming caught up somewhere when it is wearing the ear tag. The solution shown here meets both these requirements, which are in theory incompatible. The three parts 9, 11 and 10 and 21 can be made of a rigid material. Through the contact between them, the pressure force can be transmitted to the head 9, and the ear tag can thus be fitted without problems. If, for example, the animal now becomes caught up somewhere by the part 2, the part 2 can make a pivoting movement relative to the ear at the position where part 11 connects to part 21. The material 22 will then yield and stretch like an elastic band. As soon as the part 2 is free again, the material 22 pulls the part 11 against the part 21 again. This also applies, of course, to the part 1. Moreover, it is conceivable to make the pin pivotable at one point, and not at two points.

What is claimed is:

1. An ear tag for marking an animal, said ear tag comprising:

a first ear tag part;

a second ear tag part having an accommodation opening; and a pin having a longitudinal axis, a first end and a second end, said pin including a head with a point at said first end for passing through said accommodation opening, connection means proximate said second end for connecting said pin to said first tag part, and a shank between said head and said connection means, said head being formed of a material and having at least a portion of a cutting body embedded therein, said cutting body having at least one cutting element extending generally away from said point at said first end toward said shank, said at least one cutting element defining an outer surface of said head, said outer surface being essentially conical, said cutting body being formed of a material that has treater hardness than said material of said head, wherein the cutting body is essentially conical, said cutting body including a disc element which is provided with openings, said disc element forming a base of the conical cutting body, said disc element being provided on an outer periphery thereof with an annular wall standing up in a direction of a tip of the conical cutting body, a central column extending from said disc element to the tip of the conical cutting body, and wherein multiple cutting elements extend from the tip to the annular wall.

2. An ear tag for marking an animal, said ear tag comprising:

a first ear tag part;

a second ear tag part having an accommodation opening; and a pin having a longitudinal axis, a first end and a second end, said pin including a head with a point at said first end for passing through said accommodation opening, connection means proximate said second end for connecting said pin to said first tag part, and a shank between said head and said connection means, said head being formed of a material and having at least a portion of a cutting body embedded therein, said cutting body having at least one cutting element extending generally away from said point at said first end toward said shank, said at least one cutting element defining an outer surface of said head, said cutting body being formed of a material that has greater hardness than said material of said head, wherein the head of the pin is connected to the shank so that said pin is rigid under axial compression and is flexible in a direction essentially perpendicular to said axis, and said head of the pin is a separate part which rests against the shank, further comprising a flexible connecting element connecting said head and said shank of the pin to each other, and wherein said flexible connecting element is an element of elastically stretchable material extending through said shank and connected to said head of the pin.

3. An ear tag for marking an animal, said ear tax comprising:

a first ear tag part;

a second ear tag part having an accommodation opening; and a pin having a longitudinal axis, a first end and a second end, said pin including a head with a point at said first end for passing through said accommodation opening, said head having an essentially conical outer surface, connection means proximate said second end for connecting said pin to said first tag part, and a shank between said head and said connection means, said head having an annular shoulder projecting outwards relative to said shank of the pin, said head being formed of a material and having at least a portion of a cutting body embedded therein, said cutting body having an annular element defining part of said shoulder of said head, and several cutting elements extending generally away from said point at said first end toward said annular element, said cutting elements being spaced around said outer surface, said cutting body being formed of a material that has greater hardness than said material of said head.

4. Ear tag according to claim 3, wherein the outer surface of the head is essentially conical.

5. Ear tag according to claim 4, wherein the head forms an annular shoulder projecting outwards relative to the shank of the pin, the cutting body comprising an annular element forming part of said shoulder.

6. Ear tag according to claim 3, wherein the head of the pin is connected to the shank so that said pin is rigid under axial compression and is flexible in a direction essentially perpendicular to said axis.

7. Ear tag according to claim 6, wherein said head of the pin is a separate part which rests against the shank, further comprising a flexible connecting element connecting said head and said shank of the pin to each other.

8. An ear tag as in claim 3, wherein said cutting elements lay slightly above said outer surface of said head.

9. An ear tag as in claim 3, wherein said cutting elements lay flush with said outer surface of said head.

10. An ear tag as in claim 3, wherein said cutting elements lay slightly below said outer surface of said head.

11. An ear tag for marking an animal, said ear tag comprising:

an ear tag part;

a pin having a first end and a second end, said pin including a head with a point at said first end for passing through an animal ear, said head having an essentially conical outer surface, connection means proximate said second end for connecting said pin to said ear tag part, and a shank between said head and said connection means, said head having an annular shoulder projecting outwards relative to said shank of the pin, said head being formed of a material and having at least a portion of a cutting body embedded therein, said cutting body having an annular element defining part of said shoulder of said head, and at least one cutting element including a cutting edge extending in a direction generally away from said point at said first end toward said annular element, said cutting body being formed of a material that has greater hardness than said material of said head.

12. An ear tag as in claim 11, wherein said cutting elements lay slightly above said outer surface of said head.

13. An ear tag as in claim 11, wherein said cutting elements l ay flush with said outer surf ace of said head.

14. An ear tag as in claim 11, wherein said cutting elements lay slightly below said outer surface of said head.

* * * * *